United States Patent [19]

Sakurai et al.

[11] 4,377,667
[45] Mar. 22, 1983

[54] POLYACETAL AND PROCESS OF PRODUCING SAME

[75] Inventors: Hisaya Sakurai; Minoru Hamada; Kazuhiko Matsuzaki, all of Kurashiki, Japan

[73] Assignee: Asahi Kasei Kogyo Kabushiki Kaisha, Osaka, Japan

[21] Appl. No.: 270,555

[22] Filed: Jun. 4, 1981

[30] Foreign Application Priority Data

Jun. 13, 1980 [JP] Japan .................................. 55-79671
Jun. 25, 1980 [JP] Japan .................................. 55-86344
Jul. 31, 1980 [JP] Japan .................................. 55-104387
Aug. 6, 1980 [JP] Japan .................................. 55-107096

[51] Int. Cl.$^3$ .......................... C08F 4/34; C08G 6/00
[52] U.S. Cl. .................................. 525/400; 525/398; 525/403; 525/408; 528/232; 528/233; 528/236; 528/238; 528/241; 528/242; 528/243; 528/248; 528/250; 528/270
[58] Field of Search ............... 525/398, 400, 403, 408; 528/232, 248, 250, 270

[56] References Cited

U.S. PATENT DOCUMENTS 2,768,994 10/1956 MacDonald ........................ 528/243
3,293,220 12/1966 Minami et al. ..................... 525/400
3,346,663 10/1967 Kern et al. .......................... 525/398
3,470,135 9/1969 Ishida et al. ........................ 525/398

Primary Examiner—H. S. Cockeram
Attorney, Agent, or Firm—Birch, Stewart, Kolasch & Birch

[57] ABSTRACT

A polyacetal suitable for moldings which are excellent in lubricity, wear and antistatic properties, which has at least one terminal of its linear polymer molecule capped with an alkylene oxide adduct of an alcohol or a carboxylic acid, which adduct is of the formula

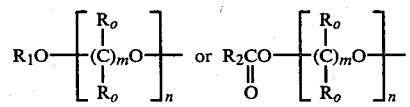

wherein $R_o$ is a hydrogen atom, alkyl group, substituted alkyl group, aryl group, or substituted aryl group, $R_o$'s may be the same or different, $R_1$ is an alkyl group, substituted alkyl group, aryl group, or substituted aryl group, $R_2$ is a hydrogen atom, alkyl group, substituted alkyl group, aryl group, or substituted aryl group, m is from 2 to 6, and n is from 1 to 1,000; the number average molecular weight of said polyacetal being in the range from 10,000 to 500,000 excluding the terminal group.

21 Claims, No Drawings

POLYACETAL AND PROCESS OF PRODUCING SAME

This invention relates to a novel polyacetal and, more particularly, to a polyacetal which has a novel terminal structure and is excellent in lubricity, wear and antistatic properties and to a process for producing same.

Acetal polymers are generally obtained by the homopolymerization of formaldehyde or trioxane or by the copolymerization of formaldehyde or trioxane with a cyclic ether. Since the acetal polymer obtained by the homopolymerization is unstable owing to its terminal hydoxyl group, it is stabilized to fit for practical use by converting the hydroxyl group into more stable groups by esterification, etherification or urethanization. The acetal polymer obtained by the copolymerization, on the other hand, retains at the terminal of the polymer chain a labile portion of repeated oxymethylene units which should be removed by hydrolysis in the presence of a basic substance to render the polymer suitable for practical use.

British Pat. No. 796,862 teaches that the molecular weight of a formaldehyde polymer can be controlled by the presence of small amounts of water, methanol or formic acid in the polymerization system. U.S. Pat. No. 3,017,389 discloses a method of polymerizing formaldehyde in the presence of a chain transfer agent such as an alcohol, ester, acid anhydride, amide or imide. It is described in U.S. Pat. No. 3,337,503 that methylal, acetal or formic acid can be used as a chain transfer agent in the copolymerization of trioxane. German Pat. No. 2,141,327 discloses a method for the copolymerization of trioxane in the presence of a polyether. Although it is possible to control the molecular weight of a polyacetal by the prior art described above, no successful technique has hitherto been developed to produce a polyacetal having a sufficiently low coefficient of friction and wear, and an excellent antistatic property.

The present invention conducted extensive studies on the molecular weight regulator and, as a result, found that a specific compound serves as both the molecular weight regulator and the terminal capping agent. This has lead to the discovery of a novel polyacetal which is unprecedentedly excellent in both lubricity, wear and antistatic properties.

According to this invention there are provided a high-molecular polyacetal and a process for the production thereof, which polyacetal comprises as major constituent a linear polymer having at least one terminal end of its molecule capped with an alkylene oxide adduct of an alcohol or a carboxylic acid, which adduct is of the formula

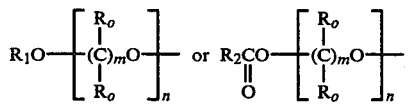

wherein $R_0$ is a hydrogen atom, alkyl group, substituted alkyl group, aryl group, or substituted aryl group the, $R_0$'s being the same or different, $R_1$ is an alkyl group, substituted alkyl group, aryl group, or substituted aryl group, $R_2$ is a hydrogen atom, alkyl group, substituted alkyl group, aryl group, or substituted aryl group, m is from 2 to 6, and n is from 1 to 1,000; the number average molecular weight of said polyacetal being in the range from 10,000 to 500,000 excluding the terminal group.

The polyacetal of this invention is a thermally stable polymer unprecedentedly excellent in lubricity, wear and antistatic properties, the coefficient of friction, the coefficient of wear and the surface resistivity being 0.14 to 0.30, 0.08 to 1.00 and $1 \times 10^{11}$ to $1 \times 10^{16} \, \Omega$, respectively. The excellent lubricity, wear and antistatic properties originate from the terminal structure of this novel polyacetal, which structure is attributable to a molecular weight regulator having molecular weight regulating function. Accordingly, it is needless to say that the acetal polymer of this invention has a desired molecular weight. Being an engineering resin, the field of use for polyacetal is expanding recently and the improvement in its lubricity, wear and antistatic properties is of important significance from the industrial viewpoint.

The polyacetal of this invention is described below in detail.

The polyacetal of this invention is a linear polymer having at least one terminal of its molecule capped with an alkylene oxide adduct of an alcohol or a carboxylic acid, said adduct being of the general formula

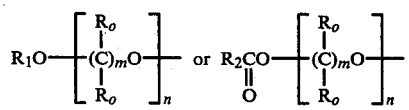

and includes a homopolymer or a copolymer.

The acetal homopolymer is a polymer comprising the recurring oxymethylene unit $-(CH_2O)-$ and the acetal copolymer is a polymer having a structure in which oxyalkylene units

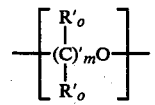

(wherein $R_0'$ is a hydrogen atom, alkyl group, substituted alkyl group, aryl group, or substituted aryl group, $R_0$'s may be the same or different, and m' is 2 to 6) are inserted into the chain of oxymethylene units. The insertion ratio of oxyalkylene unit in the acetal copolymer is 0.05–50 moles, preferably 0.1–20 moles to 100 moles of oxymethylene unit.

Examples of polyacetals of this invention are given below in structural formulas.

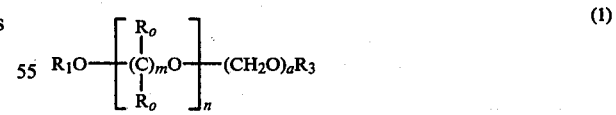 (1)

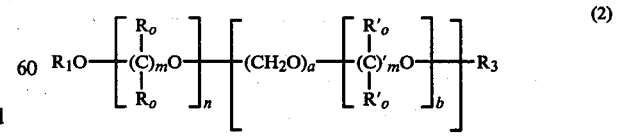 (2)

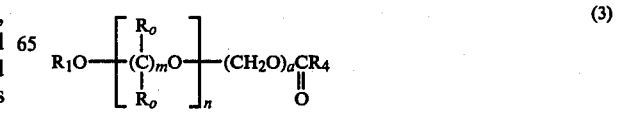 (3)

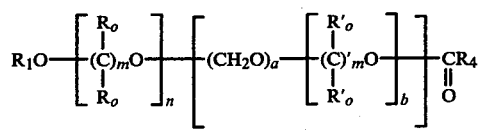 (4)

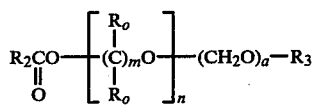 (5)

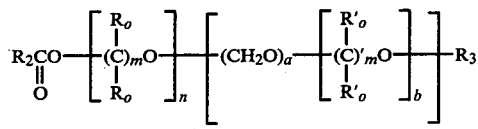 (6)

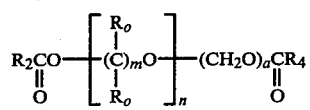 (7)

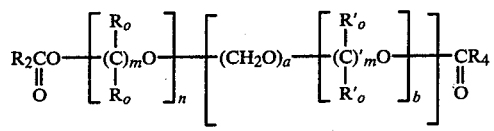 (8)

wherein $R_0$, $R_0'$, $R_1$, $R_2$, $m$, $m'$ and $n$ have the same meanings as defined above, $R_3$ and $R_4$ each is a hydrogen atom, alkyl group, substituted alkyl group, aryl group, or substituted aryl group, and

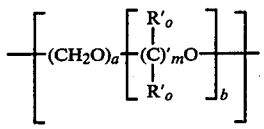

means that b units of oxyalkylene are inserted in a units of oxymethylene and does not mean the distribution of oxyalkylene unit in the polymer.

In the polyacetals represented by (1), (2), (5) or (6) of the above formulas, when $R_3$ is a hydrogen atom, the hydroxyl group at the other terminal makes the polymer unstable. Such an unstable terminal group of the polyacetal is converted into a stable group by known methods such as esterification, etherification, and urethanization or the unstable terminal portion is removed by decomposition to render the polymer suitable for practical use. When $R_3$ is not a hydrogen atom, the polyacetals of the formulas (1) to (8) have both terminals with stable groups and suitable for practical use without any further treatment.

The chemical structure of the polyacetal of this invention may be confirmed in the following way: On hydrolysis of the polyacetal in an aqueous acidic solution, formaldehyde is formed from the segment comprising the repeated oxymethylene units and an alkylene glycol

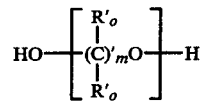

from the segment of inserted oxyalkylene units; a compound of the formula

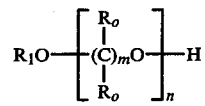

is formed from the terminal group

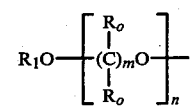

while the terminal group

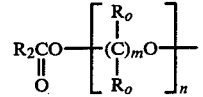

splits into

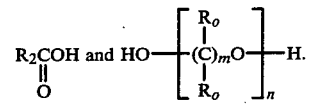

The compounds which are formed may be analyzed or determined by gas or liquid chromatography or other methods.

The number average molecular weight of the present polyacetal excluding the terminal group is similar to that of an ordinary high molecular polyacetal, that is, about 10,000 to 500,000. The lower limit of the number average molecular weight is set by the physical properties and the upper limit by the processibility of the polymer. The number average molecular weight of the polyacetal below 100,000 may be determined by osmometry or terminal group analysis. The number average molecular weight above 100,000 may be determined by utilizing the weight average molecular weight obtained by light scattering and the elution curve obtained by gel permeation chromatography (GPC).

The polyacetals of this invention include acetal homopolymers and acetal copolymers. In the acetal copolymer the oxyalkylene unit to be inserted into the polymer chain comprising chiefly repeated oxymethylene units is represented by the general formula

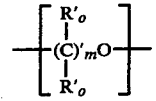

wherein $R_0'$ is a hydrogen atom alkyl group, substituted alkyl group, aryl group, or substituted aryl group, $R_0'$'s may be the same or different, and m' is 2 to 6. Examples of oxyalkylene units include oxyethylene unit $+(CH_2)_2O+$,

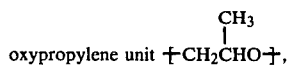
oxypropylene unit $+CH_2CHO+$, oxytrimethylene unit $+(CH_2)_3O+$, oxytetramethylene

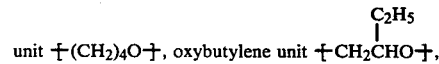
unit $+(CH_2)_4O+$, oxybutylene unit $+CH_2CHO+$, oxyhexamethylene unit $+(CH_2)_6O+$, and oxyphenyl-

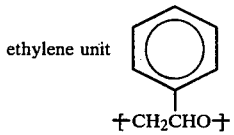
ethylene unit and the like. Of these units the oxyethylene unit and oxytetramethylene unit are particularly preferred in view of the improvement in mechanical properties of the polyacetal.

The alkylene oxide adduct of an alcohol for forming the terminal group of the present polyacetal is a compound represented by the general formula

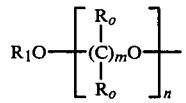

and is formed by the addition of an alkylene oxide represented by the general formula

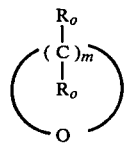

(wherein $R_0$ is a hydrogen atom, alkyl group, substituted alkyl group, aryl group, or substituted aryl group, $R_0$'s may be the same or different, and m is 2 to 6) to an alcohol represented by the general formula $R_1OH$ (wherein $R_1$ is an alkyl group, substituted alkyl group, aryl group, or substituted aryl group). The alkylene oxide adduct of a carboxylic acid for forming the terminal group of the present polyacetal is a compound represented by the general formula

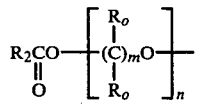

which is formed by the addition of an alkylene oxide to a carboxylic acid represented by the general formula

(wherein $R_2$ is a hydrogen atom, alkyl group, substituted alkyl group, aryl group, or substituted aryl group).

Examples of alcohols of the formula $R_1OH$ include methyl alcohol, ethyl alcohol, sec-butyl alcohol, hexyl alcohol, cyclohexyl alcohol, octyl alcohol, decyl alcohol, lauryl alcohol, cethyl alcohol, stearyl alcohol, eicosanol, ceryl alcohol, myricyl alcohol, oleyl alcohol, 3-ethyl-6-undecanol, phenol, p-butylphenol, p-octylphenol, p-nonylphenol, benzyl alcohol, and p-butylbenzyl alcohol. Of these alcohols long-chain aliphatic alcohols having 8 or more carbon atoms and p-alkylphenols having 8 or more carbon atoms in the alkyl group are preferred because of their ability to improve lubricity and wear of the present polyacetal. In view of the availability, particularly preferred are lauryl alcohol, stearyl alcohol, eicosanol, p-octylphenol and p-nonylphenol.

Examples of carboxylic acids represented by the general formula $R_2COOH$ include acetic acid, propionic acid, caproic acid, 2-ethylhexanoic acid, lauric acid, palmitic acid, stearic acid, behenic acid, oleic acid, linolic acid, ricinolic acid, phenylacetic acid, cinnamic acid benzoic acid, p-octylbenzoic acid, and α-naphthoic acid. Of these acids, long-chain aliphatic carboxylic acids having 8 or more carbon atoms are preferred from the viewpoint of the improvement in lubricity and wear of the polyacetal, and particularly preferred are lauric acid, stearic acid, oleic acid and ricinolic acid because of their easy availability.

Examples of suitable alkylene oxides are ethylene oxide, propylene oxide, butylene oxide, epichlorohydrin, styrene oxide, oxetane, 3,3-bis(chloromethyl)oxetane, tetrahydrofuran, 2-methyltetrahydrofuran and oxepane. Of these alkylene oxides, ethylene oxide is preferable in view of the improvement in antistatic property of the polymer and also ethylene oxide and propylene oxide are preferred because of their easy availability.

These alkylene oxides can be used alone or in combination of two or more. It is also possible to add successively, for example, propylene oxide, ethylene oxide, and propylene oxide to an alcohol or a carboxylic acid. The molar quantity, n, of an alkylene oxide to be added to 1 mole of an alcohol or carboxylic acid should be 1 to 1,000. A larger value of n is desirable from the viewpoint of the improvement in lubricity, wear and antistatic properties of the polymer, while a smaller value of n is preferable in view of the easy production and purification of the adduct. To make a compromise, a suitable value of n is in the range of from 2 to 250.

The preparation of the polyacetal of this invention is described below.

The polyacetal according to this invention is prepared by the homopolymerization of formaldehyde or trioxane in the presence of a compound represented by the general formula

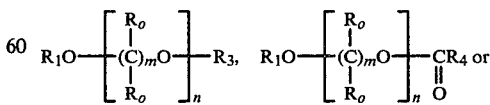

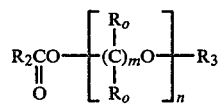

wherein $R_o$ is a hydrogen atom, alkyl group, substituted alkyl group, aryl group, or substituted aryl group, $R_o$'s may be the same or different; $R_1$ is an alkyl group, substituted alkyl group, aryl group, or substituted aryl group; $R_2$ is a hydrogen atom, alkyl group, substituted alkyl group, aryl group, or substituted aryl group; $R_3$ is a hydrogen atom, alkyl group, substituted alkyl group, aryl group, or substituted aryl group; $R_4$ is a hydrogen atom, alkyl group, substituted alkyl group, aryl group, or substituted aryl group; m is 2 to 6 and n is 1 to 1,000.

The polyacetal of this invention is also prepared by the homopolymerization of trioxane in the presence of a compound represented by the general formula

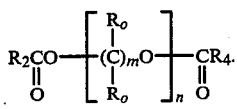

Further, the polyacetal of this invention is prepared by the copolymerization of formaldehyde, trioxane, or polyoxymethylene with a cyclic ether in the presence of a compound represented by the general formula

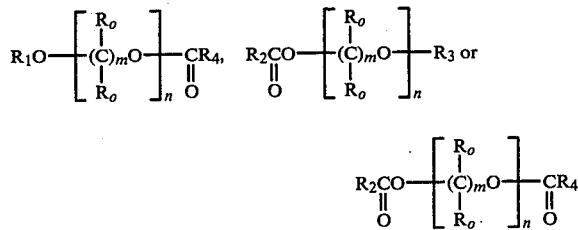

The alkylene oxide adduct of an alcohol or a carboxylic acid acts as a chain transfer agent in the homo- or co-polymerization to regulate the molecular weight of the resulting polyacetal and at the same time caps the terminal of the polymer. Consequently, the polyacetal obtained according to this invention has a desired molecular weight and at least one terminal capped.

The alkylene oxide adduct of an alcohol or a carboxylic acid used in the process of this invention is described below in detail.

The first group of the alkylene oxide adducts of alcohols and carboxylic acids includes the compounds represented by the general formula

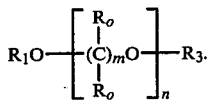

Examples of such compounds include ethylene glycol monomethyl ether, ethylene glycol monostearyl ether, tetraethylene glycol monopropyl ether, polyethylene glycol monomethyl ether (average M.W. 250), polypropylene glycol monohexyl ether (average M.W. 3,500), polytetramethylene glycol monobutyl ether (average M.W. 1,850), polyethylene glycol monodecyl ether (average M.W. 3,200), polyethylene glycol monolauryl ether (average M.W. 1,550), polyethylene glycol monostearyl ether (average M.W. 2,030), polyethyleneglycol p-octylphenyl ether (average M.W. 1,800), polyethylene glycol p-nonylphenyl ether (average M.W. 3,750), polypropylene glycol monolauryl ether (average M.W. 2,620), polypropylene glycol p-octylphenyl ether (average M.W. 2,950), polystyrene glycol monooctyl ether (average M.W. 1,050), tetraethylene glycol dimethyl ether, polyethylene glycol dioctyl ether (average M.W. 4,930), polyethylene glycol distearyl ether (average M.W. 2,850), polypropylene glycol dipropyl ether (average M.W. 4,200), and polytetramethylene glycol dioctyl ether (average M.W. 1,800).

The second group include the compounds represented by the general formula

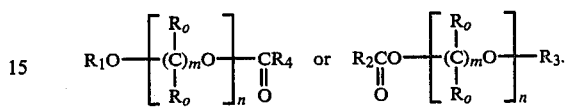

Examples are diethylene glycol monostearyl ether monoacetate, polyethylene glycol monomethyl ether monoacetate (average M.W. 2,750), polyethylene glycol monooctyl ether monoacetate (average M.W. 4,200), polyethylene glycol monobutyl ether monolaurate (average M.W. 2,850), polyethylene glycol monomethyl ether monostearate (average M.W. 1,100), polybutylene glycol monostearyl ether monocaproate (average M.W. 4,500), polyethylene glycol monoceryl ether monolaurate (average M.W. 4,950), polytetramethylene glycol monolauryl ether monostearate (average M.W. 2,700), triethylene glycol monooctanoate, polyethylene glycol monolaurate (average M.W. 1,750), polyethylene glycol monostearate (average M.W. 4,800), and polystyrene glycol monoacetate (average M.W. 2,150).

The third group includes compounds represented by the formula

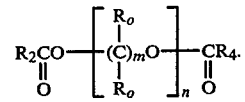

Examples are ethylene glycol dioctanoate, pentaethylene glycol distearate, polyethylene glycol dilaurate (average M.W. 6,250), polyethylene glycol distearate (average M.W. 2,850), and polypropylene glycol dipalmitate (average M.W. 6,350).

Before being used as a molecular weight regulator in polymerization reactions, the alkylene adduct of an alcohol or a carboxylic acid should preferably be purified by means of distillation, adsorption, drying or the like. These adducts can be used each alone or in mixtures.

In the homopolymerization according to this invention, thoroughly purified formaldehyde or trioxane is used as the starting material. There is generally used an anionic polymerization catalyst for the homopolymerization of formaldehyde and a cationic polymerization catalyst for the homopolymerization of trioxane.

In the copolymerization according to this invention, thoroughly purified formaldehyde, trioxane, or polyoxymethylene is used as the starting material. These starting materials are copolymerized with a cyclic ether by use of a cationic polymerization catalyst.

The first group of cyclic ethers to be copolymerized with the above starting materials includes alkylene oxides represented by the general formula

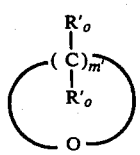

wherein R′₀ is a hydrogen atom, alkyl group, substituted alkyl group, aryl group, or substituted aryl group, R′₀'s may be the same or different, and m′ is 2 to 6. Examples include ethylene oxide, propylene oxide, butylene oxide, epichlorohydrin, styrene oxide, oxetane, 3,3-bis(-chloromethyl)oxetane, tetrahydrofuran, and oxepane. Of these alkylene oxides, particularly preferred is ethylene oxide.

The second group of cyclic ethers includes cyclic formals represented by the general formula

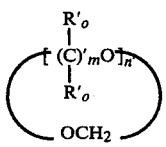

wherein n′ is 1 to 10. Examples are ethylene glycol formal, propylene glycol formal, diethylene glycol formal, triethylene glycol formal, 1,4-butanediol formal, 1,5-pentanediol formal, and 1,6-hexanediol formal. Of these cyclic formals, particularly preferred are ethylene glycol formal, diethylene glycol formal, and 1,4-butanediol formal.

The cyclic ether is used in an amount of 0.03 to 100, preferably 0.1 to 50, parts by weight for 100 parts by weight of the starting material.

The anionic and the cationic polymerization catalysts used in the homopolymerization and copolymerization according to this invention are the compounds as described below.

The representative group of anionic polymerization catalysts includes alkali metals such as sodium and potassium; alkali metal complexes such as sodium naphthalene and potassium anthracene; alkali metal hydrides such as sodium hydride; alkaline earth metal hydrides such as calcium hydride; alkali metal alkoxides such as sodium methoxide and potassium tert-butoxide; alkali metal carboxylates such as sodium caproate and potassium stearate; alkaline earth metal carboxylates such as magnesium caproate and calcium stearate; amines such as n-butylamine, diethylamine, trioctylamine, and pyridine; quaternary ammonium salts such as ammonium stearate, tetrabutylammonium acetate, and dimethyldistearylammonium acetate; phosphonium salts such as tetramethylphosphonium propionate and trimethylbenzylphosphonium ethoxide; tetravalent organotin compounds such as tributyltin chloride, dibutyltin dilaurate, and dibutyltin dimethoxide; and metalalkyls such as n-butyllithium and ethylmagnesium chloride.

Examples of cationic polymerization catalysts are so-called Friedel-Crafts compounds including stannic tetrachloride, stannic tetrabromide, titanium tetrachloride, aluminum trichloride, zinc chloride, vanadium trichloride, antimony pentafluoride, boron trifluoride, and boron trifluoride coordinated compounds such as boron trifluoride diethyl-etherate, boron trifluoride dibutyl-etherate, boron trifluoride acetic anhydride, and boron trifluoride triethylamine complex; inorganic and organic acids such as perchloric acid, acetyl perchlorate, hydroxyacetic acid, trichloroacetic acid, and p-toluenesulfonic acid; complex salt compounds such as triethyloxonium tetrafluoroborate, triphenylmethyl hexafluoroantimonate, allyldiazonium hexafluorophosphate, and allyldiazonium tetrafluoroborate; and metalalkyls such as diethylzinc, triethylaluminum, and diethylaluminum chloride.

These anionic and cationic polymerization catalysts are used in an amount of 0.0005 to 5 parts by weight for 100 parts by weight of the starting material.

The homopolymerization or copolymerization is carried out either in the absence of a solvent or in the presence of an organic medium. The solventless homopolymerization proceeds upon addition of a polymerization catalyst to a mixture of a starting material and a molecular weight regulator. The solventless copolymerization proceeds upon addition of a polymerization catalyst to a mixture of a starting material, a cyclic ether and a molecular weight regulator.

The homopolymerization in an organic medium proceeds upon addition of a polymerization catalyst to an organic medium containing a starting material and a molecular weight regulator. The copolymerization in an organic medium proceeds upon addition of a polymerization catalyst to an organic medium containing a starting material, a cyclic ether and a molecular weight regulator. The organic media suitable for use in the process of this invention include aliphatic hydrocarbons such as n-pentane, n-hexane, n-heptane, n-octane, cyclohexane, and cyclopentane; aromatic hydrocarbons such as benzene, toluene, and xylene; halogenated aliphatic hydrocarbons such as methylene chloride, chloroform, carbon tetrachloride, ethylene chloride, and trichloroethylene; and halogenated aromatic hydrocarbons such as chlorobenzene and o-dichlorobenzene. These organic media are used each alone or in mixtures.

The molecular weight regulators are used as dissolved or dispersed homogeneously in the reaction system. The optimal concentration of a molecular weight regulator in the reaction system can easily be determined experimentally in accordance with the desired molecular weight of the polyacetal.

The reaction temperature is generally in the range of $-20°$ to $230°$ C., preferably $20°$ to $210°$ C. for the solventless polymerization and $-10°$ C. to $120°$ C. when an organic medium is used. The reaction time is not critical but is generally from 5 seconds to 300 minutes.

After a predetermined period of reaction time, a shortstop is added to the reaction to terminate the homopolymerization or copolymerization. The resulting polymer is stabilized by hydrolysis to remove the labile terminal group or by capping the labile terminal group by esterification or the like. The stabilized polyacetal is further admixed with a stabilizer or the like to render it suitable for practical use.

The characteristic features of the novel polyacetal of this invention and the process for producing such a polyacetal, which were described in detail in the foregoing, may be summarized as follows:

(1) The polyacetal of this invention is excellent in lubricity, wear and antistatic properties.

(2) By the use of a specified compound as molecular weight regulator, it is possible to impart excellent properties to the polyacetal which is formed and, at the same time, to regulate molecular weight of the polymer as required.

In Examples given hereunder, the following items were tested.

Reduced viscosity: A value obtained by measuring the viscosity of a solution of the polymer (0.5 g/dl) in a p-chlorophenol-tetrachloroethylene mixture (1:1 by weight) at 60° C.

Rv 222: Percentage of the residue when a polymer, the terminal of which has been stabilized with acetic anhydride, is heated in vacuum at 222° C. for 60 minutes. This value serves as a measure for the thermal stability.

Coefficient of friction and wear: A value obtained by mixing together 100 parts of a polymer which has been subjected to terminal stabilization with acetic anhydride, 0.25 part of 2,2-methylene-bis(4-methyl-6-tert-butylphenol) and 0.75 part of a terpolymer of polycaprolactam, polyhexamethylene adipamide and polyhexamethylene sebacamide, then milling and extruding the mixture by means of a 50-mm φ extruder, and testing by use of a thrust-type friction and wear testing machine.

| Test Conditions[1] | Coefficient of friction | Coefficient of wear (μ/km) |
|---|---|---|
| Load (kg/cm²) | 10 | 2 |
| Linear Velocity (cm/sec) | 12 | 60 |

[1]Contact of specimen against steel (S45C)

These values are the measure for lubricity and wear.

Surface resistivity: A value obtained by measuring at 20° C. and 50% R.H. It is a measure for the antistatic property.

EXAMPLE 1

(1) Preparation of polyacetal

Thoroughly dried paraformaldehyde was subjected to thermal decomposition at 150° C. and the gaseous products were passed several times through cold traps to obtain formaldehyde gas of 99.9% purity. This formaldehyde was introduced at a rate of 110 parts by weight per hour (hereinafter all parts are by weight) into 500 parts of toluene containing $1.0 \times 10^{-4}$ mole/liter of tetrabutylammonium acetate and $5.0 \times 10^{-3}$ mole/liter of polyethylene glycol monostearyl ether $C_{18}H_{37}O(CH_2CH_2O)_{40}H$ (an addition product of stearyl alcohol with 40 moles of ethylene oxide; hereinafter referred to briefly as S-40) used as a molecular weight regulator. Simultaneously with the introduction of formaldehyde, a toluene solution containing $1.0 \times 10^{-4}$ mole/liter of tetrabutylammonium acetate and $5.0 \times 10^{-3}$ mole/liter of S-40 was fed at a rate of 500 parts/hour. The feeding of formaldehyde and the toluene solution was continued for 3 hours while keeping the temperature of the polymerization system at 60° C. The toluene solution containing the polymer was removed from the reactor at a rate corresponding to the feeding rate. The polymer was separated by filtration, washed thoroughly with acetone, and vacuum dried at 60° C. to obtain 289 parts of a white polymer.

(2) Confirmation of the structure of polyacetal

In 95 parts of 1 N hydrochloric acid, 5 parts of the polyacetal obtained in (1) was dispersed. The dispersion was heated at 90° C. for 5 hours. Upon this treatment, the portion comprising the recurring oxymethylene units was completely subjected to hydrolysis and returned to formaldehyde ($CH_2O$), while the alkylene oxide adduct of an alcohol remained intact under the above conditions. The solution was neutralized with 0.5 N aqueous sodium hydroxide solution, evaporated under atmospheric pressure, and extracted with 50 parts of tetrahydrofuran. The extract was analyzed by liquid chromatography. There was detected $7.5 \times 10^{-4}$ mole of $C_{18}H_{37}O(CH_2CH_2O)_{40}H$ per mole of formaldehyde.

Fifty parts of the polyacetal obtained in (1) was heated together with 500 parts of acetic anhydride and 0.1 part of sodium acetate at 139° C. for 3 hours and 49 parts of the polymer was recovered. The polymer was analyzed for the terminal acetyl group

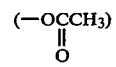

by infrared absorption spectroscopy and $8.5 \times 10^{-4}$ mole of the terminal acetyl group was found for 1 mole of formaldehyde. This terminal group detected as a terminal acetyl group should correspond to the terminal hydroxyl groups (—OH) of the polymer obtained in (1). The number average molecular weight was found to be $\overline{Mn} = 37,500$ by calculation using the equation $$\overline{Mn} = \frac{60}{\text{(Mole of total terminal group per mole of formaldehyde)}}$$

From the above results, the structure and composition of the polyacetal obtained in (1) were estimated as follows:

(A) $C_{18}H_{37}O(CH_2CH_2O)_{40}(CH_2O)_{1240}H$: 94% by weight (B) $HO(CH_2O)_{1240}H$: 6% by weight of the above two polymers, (A) has a bearing on S-40 used as molecular weight regulator and (B) on the water present in trace amount in the polymerization system.

(3) Test for physical properties of polyacetal

The polyacetal obtained in (1) showed a reduced viscosity of 2.05, as expected. Rv was 99%, a value indicative of excellent thermal stability. The polymer, which had undergone terminal stabilization, was incorporated with a stabilizer and injected to prepare a very tough molded product having coefficient of friction and wear of 0.16 and 0.09 μ/km respectively and a surface resistivity of $4 \times 10^{11} \Omega$, indicating excellent lubricity and wear and antistatic properties.

EXAMPLE 2

Formaldehyde, in gas form and 99.9% pure, was fed at a rate of 110 parts/hour continuously for 3 hours to 500 parts of cyclohexane containing $1 \times 10^{-4}$ mole/liter of dibutyltin dilaurate and $16.0 \times 10^{-3}$ mole/liter of polyethylene glycol monooctyl ether monoacetate $C_8H_{17}O(CH_2CH_2O)_{20}COCH_3$ (a compound formed by acetylating the ethylene oxide adduct of octyl alcohol containing 20 moles of added ethylene oxide; hereinafter referred to briefly as 0–20), used as molecular weight regulator. At the same time, the same cyclohexane solution as used above, which contained dibutyltin dilaurate and 0–20, was fed at a rate of 500 parts/hour continuously for 3 hours. The polymerization temperature was kept at 45° C. The polymer which was formed was separated from the cyclohexane, washed, and dried to obtain 288 parts of the polymer. The polymer was analyzed by infrared absorption spectroscopy and $9.5 \times 10^{-4}$ mole of terminal acetyl group was found per mole of formaldehyde. On acid hydrolysis, the polymer gave $9.5 \times 10^{-4}$ mole of $C_8H_{17}O(CH_2CH_2O)_{20}H$ per mole of formaldehyde. After acetylation with acetic anhydride, the polymer gave $1.10 \times 10^{-3}$ mole of terminal acetyl group per mole of formaldehyde. From the above results, it was confirmed that a polymer having a number average molecular weight of 29,300 and the following composition had been formed.

(C) $C_8H_{17}O(CH_2CH_2O)_{20}(CH_2O)_{980}COCH_3$: 93% by weight (D) $HO(CH_2O)_{980}H$: 7% by weight The molecular weight and the reduced viscosity of 1.63 were both as expected. The Rv of 98%, the friction coefficient of 0.22, wear coefficient of 0.32 μ/km and the surface resistivity of $8 \times 11^{11} \Omega$ were all good.

EXAMPLE 3

(4) Preparation of polyacetal

Into a double arm kneader with sigma-blades, were charged 500 parts of thoroughly purified trioxane, 15 parts of ethylene oxide, and 28.5 parts of polyethylene glycol distearyl ether $C_{18}H_{37}O(CH_2CH_2O)_{40}C_{18}H_{37}$ (average number of moles of added ethylene oxide, 40; hereinafter referred to briefly as DS-40). Into the kneader heated at 70° C., was added 0.3 part of boron trifluoride dibutyl-etherate: After the kneader had been operated for 70 minutes, 10 parts of tributylamine was added to terminate the copolymerization. The polymerizate was discharged from the kneader and washed with acetone to obtain 507 parts of an acetal copolymer.

(5) Confirmation of the structure of polyacetal

In 95 parts of 1 N hydrochloric acid, was dispersed 5 parts of the polyacetal obtained in (4) and the mixture was heated at 90° C. for 6 hours. Upon this hydrolysis, the segment of oxymethylene units was converted to formaldehyde and the segment of oxyalkylene units to ethylene glycol. On gas chromatographic analysis, it was found that 2.0 moles of oxyethylene units had been inserted in 100 moles of oxymethylene units in the copolymer. The hydrolysis mixture was neutralized with 0.5 N aqueous sodium hydroxide solution, evaporated at atomspheric pressure, and extracted with 50 parts of tetrahydrofuran. On liquid chromatographic analysis of the extract solution, the following compounds were detected in the following concentrations based on 1 mole of formaldehyde.

$C_{18}H_{37}O(CH_2CH_2O)_{40}H$: $7.3 \times 10^{-3}$ mole $C_{18}H_{37}OH$: $7.3 \times 10^{-3}$ mole Acetylation of the terminal group was performed by heating 50 parts of the polymer obtained in (4) with 500 parts of acetic anhydride and 0.1 part of sodium acetate at 139° C. for 3 hours to recover 49 parts of the polymer. On analysis of the recovered polymer for terminal group by infrared absorption spectroscopy, $4 \times 10^{-5}$ mole of terminal acetyl group was detected for 1 mole of formaldehyde. This terminal acetyl group corresponds to the terminal hydroxyl group of the copolymer obtained in (4).

From the above results of analysis, the quantity of total terminal group of the copolymer obtained in (4) was $15.0 \times 10^{-4}$ moles per mole of formaldehyde and the number average molecular weight was found to be 40,000, as calculated by the equation $\overline{Mn} = 60/(\text{total terminal group})$. Therefore, the structure and composition of the polyacetal obtained in (4) were as follows:

(E) $C_{18}H_{37}O(CH_2CH_2O)_{40}\{(CH_2O)_{1295}(CH_2CH_2O)_{26}\}C_{18}H_{37}$: 97% by weight (F) $HO\{(CH_2O)_{1295}(CH_2CH_2O)_{26}\}H$: 3% by weight Remark: The formula $(CH_2O)_{1295}(CH_2CH_2O)_{26}$ means that 26 oxyethylene units are inserted in 1295 oxymethylene units and does not mean the distribution of oxyethylene unit in the polymer chain.

Of the above two copolymers, (E) is originated from DS-40 used as the molecular weight regulator and (F) from water present in a trace amount in the polymerization system.

(6) Test for physical properties of polyacetal

The polyacetal obtained in (4) showed a reduced viscosity of 1.85, as expected. Rv was 99%, indicating excellent thermal stability. A very tough molded product was obtained from the polymer which had been terminally stabilized with acetic anhydride and further incorporated with a stabilizer. This molded product showed a coefficient of friction of 0.16, coefficient of wear of 0.10 μ/km and a surface resistivity of $4 \times 10^{11} \Omega$, indicating that the product is excellent in both lubricity, wear and antistatic properties.

EXAMPLE 4

(7) Preparation of polyacetal

Into 500 parts of toluene containing $1.7 \times 10^{-1}$ mole/liter of propylene oxide as cyclic ether, $3.2 \times 10^{-3}$ mole/liter of polyethylene glycol monobutyl ether monolaurate,

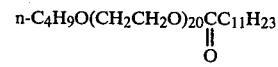

(a compound formed by the esterification of an ethylene oxide adduct of n-butyl alcohol with lauric acid; average number of moles of added ethylene oxide, 20; hereinafter referred to briefly as BL-20) as molecular weight regulator, and $1 \times 10^{-3}$ mole/liter of stannic tetrachloride as polymerization catalyst, was fed 99.9% pure formaldehyde in gas form continuously for 3 hours at a rate of 100 parts/hour. At the same time, a toluene solution containing the cyclic ether, molecular weight regulator and polymerization catalyst in the same concentrations as above was fed for 3 hours at a rate of 500 parts/hour. The polymerization temperature was kept at 5° C. throughout. The resulting copolymer was separated from the toluene, washed and dried to obtain 273 parts of a polymer.

(8) Confirmation of the structure of polyacetal

The hydrolysis of the polymer obtained in (7) gave the following results:

Content of inserted oxypropylene units: 2.8 moles per 100 moles of oxymethylene units.

n-$C_4H_9O(CH_2CH_2O)_{20}H$: $4.5 \times 10^{-4}$ mole per mole of formaldehyde $C_{11}H_{23}COOH$: $4.5 \times 10^{-4}$ mole per mole of formaldehyde On acetylation of the polymer obtained in (7), the terminal carbonyl group showed an increase of $5 \times 10^{-5}$ mole per mole formaldehyde, corresponding to the terminal hydroxyl group of the copolymer obtained in (7).

The above analytical results showed that the polymer has a number average molecular weight of 63,200 and was a mixture of the following two copolymers:

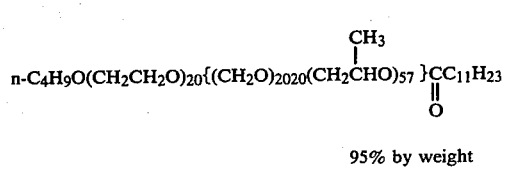

95% by weight

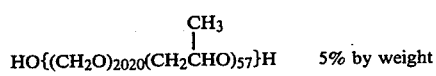  5% by weight

Remark: The formula

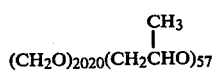

shows that 57 oxypropylene units are inserted in 2020 oxymethylene units.

Of the above two copolymers, (G) has a bearing on BL-20 used as molecular weight regulator and (H) on the water present in a trace amount in the polymerization system.

(9) Test for physical properties of polyacetal

Physical properties of the polyacetal obtained in (7) were found to be as follows:

Reduced viscosity, 3.50; Rv, 99%; coefficient of friction, 0.19 coefficient of wear 0.20 $\mu$/km; surface resistivity, $5 \times 10^{15} \Omega$ These results showed that the polyacetal is excellent in lubricity and wear owing to the copolymer represented by the formula (G).

EXAMPLE 5

(10) Preparation of polyacetal

In an autoclave, a mixture of 150 parts of dried polyoxymethylene dihydroxide having a number average molecular weight of $1.5 \times 10^5$, 3.5 parts of ethylene oxide, 3.1 parts of pentaethylene glycol disterate

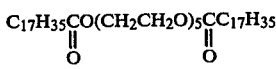

(a compound formed by esterification of an ethylene oxide adduct of stearic acid with stearic acid; average number of moles of added ethylene oxide, 5; hereinafter referred to briefly as DS-5), and 500 parts of toluene was heated at 75° C. To the autoclave, was added 0.1 part of boron trifluoride diethyl-etherate and the mixture was stirred for 40 minutes. After the addition of 2 parts of tributylamine, the reaction mixture was discharged from the autoclave, washed, and dried to obtain 151 parts of a polymer.

(11) Confirmation of the structure of polyacetal

Upon analysis of the structure of the polymer in the same manner as in Example 3, the formation of the following two types of copolymers was confirmed:

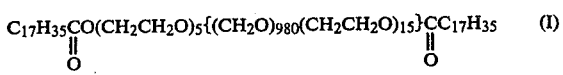

60% by weight (J) HO{$(CH_2O)_{980}(CH_2CH_2O)_{15}$}OH: 40% by weight
Remark: The formula $(CH_2O)_{980}(CH_2CH_2O)_{15}$ shows that 15 oxyethylene units were inserted in 980 oxymethylene units.

Of the two types of copolymers, (I) was associated with DS-5 used as molecular weight modifier and (J) with the terminal hydroxyl group of polyoxymethylene used as starting material and a trace amount of water present in the polymerization system.

(12) Test for physical properties of polyacetal

The physical properties of the polyacetal obtained in (10) were found to be as follows:

Reduced viscosity, 1.56; Rv, 99%; coefficient of friction, 0.24; coefficient of wear, 0.35 $\mu$/km; surface resistivity, $6 \times 10^{14} \Omega$.

Lubricity and wear were improved owing to the copolymer represented by (I).

EXAMPLES 6 TO 12

The preparative procedure of Example 1 was followed, except that the molecular weight regulators shown in Table 1 were used in place of S-40. The results obtained were as shown in Table 1. All of the polyacetals obtained in these Examples showed good lubricity, wear and antistatic properties.

COMPARATIVE EXAMPLE 1

The preparative procedure of Example 1 was repeated, except that hexyl alcohol was used as molecular weight regulator in place of S-40. The results obtained were as shown in Table 1. When a polyacetal was produced by use of hexyl alcohol, although the regulation of molecular weight was possible, lubricity, wear and antistatic properties were poor.

COMPARATIVE EXAMPLE 2

The preparative procedure of Example 1 was followed, except that hexyl propionate was used as molecular weight regulator in place of S-40. The results obtained were as shown in Table 1. When hexyl propionate was used, the control of molecular weight of polyacetal was imperfect and lubricity, wear and the antistatic property were not good.

COMPARATIVE EXAMPLE 3

(13) Preparation of acetal copolymer

The preparative procedure of Example 3 was repeated, except that 0.010 part of water was added in place of DS-40. There were obtained 495 parts of a polymer.

(14) Confirmation of the structure of acetal copolymer

Upon analysis of the hydrolyzate of the copolymers obtained in (13), 2.0 moles of ethylene glycol were detected for 100 moles of formaldehyde. The acetylated product of the copolymer gave $20.0 \times 10^{-4}$ mole of terminal acetyl group per mole of formaldehyde. From the above results, the copolymer was found to be of the composition:

HO{$(CH_2O)_{970}(CH_2CH_2O)_{19}$}H: 100% by weight wherein $(CH_2O)_{970}(CH_2CH_2O)_{19}$ means that 19 oxyethylene units had been inserted in 970 oxymethylene units.

(15) Test for physical properties of acetal copolymer

The physical properties of the copolymer obtained in (13) were found to be as follows:
Reduced viscosity, 1.62; Rv, 98%; coefficient of friction, 0.37; coefficient of wear, 1.35 μ/km; surface resistivity, $>10^{16}$.
The above results indicate that both lubricity, wear and the antistatic property are poor.

EXAMPLES 13 TO 19

The test results of the copolymers obtained in these Examples were as summarized in Table 2. It is apparent that all of these copolymers are excellent in lubricity, wear and antistatic properties.

COMPARATIVE EXAMPLES 4 AND 5

In Table 2 are also shown the test results of the copolymers obtained in these Comparative Examples. It is also apparent that these copolymers are quite inferior to the polyacetals of this invention in both lubricity, wear and antistatic properties.

EXAMPLE 20

In a double arm kneader with sigma-blades, a mixture of 500 parts of thoroughly purified trioxane and 25.8 parts of polyethylene glycol distearyl ether $C_{18}H_{37}O(CH_2CH_2O)_{40}C_{18}H_{37}$ (40 moles of added ethylene oxide in average) was heated at 70° C. To the mixture was added 0.25 part of boron trifluoride dibutyletherate. After the mixture was stirred for 70 minutes, the polymerization was terminated by adding 8 parts of tributylamine. The polymerizate was discharged from the kneader and washed with acetone to yield 506 parts of polyacetal having a reduced viscosity of 1.83, as expected. Rv was 99%, indicating excellent thermal stability of the polymer. After terminal stabilization with acetic anhydride, the polymer was incorporated with a stabilizer and molded. The molded product was tough and showed a coefficient of friction of 0.16, coefficient of wear of 0.09μ/km and a surface resistivity of $5 \times 10^{11}$ Ω, indicating excellent lubricity, wear and antistatic properties.

TABLE 1

| Example No. | Molecular weight regulator ($\times 10^{-3}$ mole/liter) | | Number average molecular weight | Structure and composition (% by weight) | |
|---|---|---|---|---|---|
| 6 | $C_{12}H_{25}O(CH_2\overset{CH_3}{\underset{\mid}{C}H}O)_{20}H$ | 3.8 | 35,500 | $C_{12}H_{25}O(CH_2\overset{CH_3}{\underset{\mid}{C}H}O)_{20}(CH_2O)_{1180}H$ | 95 |
| 7 | $C_{10}H_{21}O(CH_2CH_2O)_{40}COCH_3$ | 11.4 | 37,900 | $C_{10}H_{21}O(CH_2CH_2O)_{40}(CH_2O)_{1260}COCH_3$ | 96 |
| 8 | $p\text{-}C_9H_{19}\text{-}\phi\text{-}O(CH_2CH_2O)_4H$ | 3.0 | 40,200 | $p\text{-}C_9H_{19}\text{-}\phi\text{-}O(CH_2CH_2O)_4(CH_2O)_{1340}H$ | 95 |
| 9 | $p\text{-}C_8H_{17}\text{-}\phi\text{-}O(CH_2\overset{C_2H_5}{\underset{\mid}{C}H}O)_{25}H$ | 2.2 | 75,400 | $p\text{-}C_8H_{17}\text{-}\phi\text{-}O(CH_2\overset{C_2H_5}{\underset{\mid}{C}H}O)_{25}(CH_2O)$ | 94 |
| 10 | $CH_3O(CH_2CH_2O)_{20}H$ | 0.8 | $1.5 \times 10^{5(1)}$ | $CH_3O(CH_2CH_2O)_{20}(CH_2O)_{5000}H$ | 96 |
| 11 | $C_8H_{17}O(CH_2\overset{\phi}{\underset{\mid}{C}H}O)_{15}H$ | 0.6 | $1.7 \times 10^{5(1)}$ | $C_8H_{17}O(CH_2\overset{\phi}{\underset{\mid}{C}H}O)_{15}(CH_2O)_{5700}H$ | 94 |
| 12 | $CH_3O(CH_2CH_2O)_{250}COC_{17}H_{35}$ | 13.4 | 35,500 | $CH_3O(CH_2CH_2O)_{250}(CH_2O)_{1180}COC_{17}H_{35}$ | 97 |
| Comparative Example 1 | $C_6H_{13}OH$ | 0.9 | 40,100 | — | — |
| Comparative Example 2 | $C_6H_{13}OCOC_2H_5$ | 7.0 | $1.2 \times 10^{5(1)}$ | — | — |

| Example No. | Yield (parts) | Reduced viscosity | Coeff. of friction | Coefficient of wear (μ/km) | Surface resistivity (Ω) |
|---|---|---|---|---|---|
| 6 | 288 | 1.75 | 0.18 | 0.15 | $6 \times 10^{15}$ |
| 7 | 287 | 1.81 | 0.18 | 0.13 | $5 \times 10^{11}$ |
| 8 | 285 | 2.03 | 0.19 | 0.16 | $3 \times 10^{13}$ |
| 9 | 288 | 4.11 | 0.19 | 0.16 | $6 \times 10^{15}$ |
| 10 | 286 | 12.30 | 0.25 | 0.75 | $8 \times 10^{11}$ |
| 11 | 285 | 14.25 | 0.24 | 0.47 | $8 \times 10^{15}$ |
| 12 | 284 | 1.75 | 0.19 | 0.15 | $2 \times 10^{11}$ |
| Comparative Example 1 | 288 | 2.15 | 0.35 | 1.33 | $>10^{16}$ |
| Comparative Example 2 | 286 | 10.03 | 0.35 | 1.33 | $>10^{16}$ |

Note:
[1] Number average molecular weight as determined by light scattering and gel permeation chromatography.

TABLE 2

| Example No. | Structure and Composition of polyacetal (% by weight) | | Coefficient of friction | Coefficient of wear (μ/km) | Surface resistivity (Ω) |
|---|---|---|---|---|---|
| 13 | $CH_3O(CH_2CH_2O)_{50}\{(CH_2O)_{1100}(CH_2CH_2O)_{51}\}H$ | | 94 | 0.25 | 0.45 | $5 \times 10^{11}$ |
| 14 | $C_3H_7O(CH_2\overset{CH_3}{\underset{|}{C}}HO)_8\{(CH_2O)_{1510}(CH_2\overset{C_2H_5}{\underset{|}{C}}HO)_{15}\}C_3H_7$ | | 96 | 0.28 | 0.52 | $6 \times 10^{15}$ |
| 15 | $CH_3O(CH_2CH_2O)_{110}\{(CH_2O)_{1330}(CH_2CH_2O)_8\}\underset{O}{\overset{\|}{C}}CH_3$ | | 95 | 0.22 | 0.42 | $3 \times 10^{11}$ |
| 16 | $C_{20}H_{41}O(CH_2CH_2O)_{25}\{(CH_2O)_{1330}(CH_2CH_2CH_2CH_2O)_{25}\}\underset{O}{\overset{\|}{C}}C_{11}H_{23}$ | | 98 | 0.16 | 0.10 | $6 \times 10^{11}$ |
| 17 | $C_8H_{17}O(CH_2CH_2O)_{10}\{(CH_2O)_{1330}(CH_2CH_2O)_{30}\}(CH_2CH_2O)_{10}C_8H_{17}$ | | 90 | 0.19 | 0.27 | $8 \times 10^{11}$ |
| 18 | $CH_3\underset{O}{\overset{\|}{C}}O(CH_2\overset{Ph}{\underset{|}{C}}HO)_{20}\{(CH_2O)_{5000}(CH_2\overset{Ph}{\underset{|}{C}}HO)_{75}\}H$ | | 73 | 0.25 | 0.45 | $8 \times 10^{15}$ |
| 19 | $C_{11}H_{23}\underset{O}{\overset{\|}{C}}O(CH_2CH_2O)_{35}\{(CH_2O)_{2100}(CH_2\overset{CH_3}{\underset{|}{C}}HO)_{42}\}\underset{O}{\overset{\|}{C}}C_{11}H_{23}$ | | 95 | 0.16 | 0.10 | $5 \times 10^{11}$ |
| Comparative Example 4 | $CH_3\underset{O}{\overset{\|}{C}}O\{(CH_2O)_{1330}(CH_2CH_2O)_{25}\}\underset{O}{\overset{\|}{C}}CH_3$ | | 100 | 0.36 | 1.33 | $>10^{16}$ |
| Comparative Example 5 | $C_6H_{13}O\{(CH_2O)_{1330}(CH_2CH_2O)_{28}\}\underset{O}{\overset{\|}{C}}CH_3$ | | 95 | 0.33 | 1.32 | $>10^{16}$ |

What is claimed is:

1. A polyacetal having at least one terminal of its linear polymer molecule capped with an alkylene oxide adduct of an alcohol or a carboxylic acid, which adduct is represented by the general formula $$R_1O\left[\begin{array}{c}R_o\\|\\(C)_mO\\|\\R_o\end{array}\right]_n \quad \text{or} \quad R_2\underset{O}{\overset{\|}{C}}O\left[\begin{array}{c}R_o\\|\\(C)_mO\\|\\R_o\end{array}\right]_n$$

wherein $R_o$ is a hydrogen atom, alkyl group, substituted alkyl group, aryl group, or substituted aryl group, $R_o$'s may be the same or different, $R_1$ is an alkyl group, substituted alkyl group, aryl group, or substituted aryl group, $R_2$ is a hydrogen atom, alkyl group, substituted alkyl group, aryl group, or substituted aryl group, m is from 2 to 6, and n is from 1 to 1,000; said polyacetal having a number average molecular weight ranging from 10,000 to 500,000 excluding the terminal group.

2. The linear polymer according to claim 1, which is an acetal homopolymer comprising the recurring oxymethylene unit $+(CH_2O)+$.

3. The linear polymer according to claim 1, which is an acetal copolymer having a structure in which oxalkylene units of the formula $$\left[\begin{array}{c}R'_o\\|\\(C)'_mO\\|\\R'_o\end{array}\right]$$

wherein $R'_o$ is a hydrogen atom, alkyl group, substituted alkyl group, aryl group, or substituted aryl group, $R'_o$'s being the same or different, and m' is 2 to 6 are inserted into the polymer chain comprising the recurring oxymethylene unit.

4. A polyacetal according to claim 1 or 3, wherein 0.05 to 50 moles of the oxyalkylene unit are inserted into 100 moles of the oxymethylene unit.

5. A polyacetal according to claim 1 or 3 wherein the oxyalkylene unit is oxyethylene unit $+(CH_2)_2O+$.

6. A polyacetal according to claim 1 or 3 wherein the oxyalkylene unit is oxytetramethylene unit $-(CH_2)_4O-$.

7. A polyacetal according to claim 1, wherein the alkylene oxide adduct of an alcohol represented by the general formula $$R_1O\left[\begin{array}{c}R_o\\|\\(C)_mO\\|\\R_o\end{array}\right]_n$$

where $R_0$, $R_1$, m and n are as defined in claim 1 is an alkylene oxide adduct of a long=chain aliphatic alcohol having 8 or more carbon atoms or p-alkylated phenol wherein the alkyl group has 8 or more carbon atoms.

8. A polyacetal according to claim 1, wherein the alkylene oxide adduct of a carboxylic acid represented by the general formula

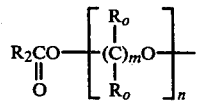

where $R_0$, $R_2$, m and n are as defined in claim 1 is an alkylene oxide adduct of a long-chain aliphatic carboxylic acid having 8 or more carbon atoms.

9. A polyacetal according to claim 7, wherein the long-chain aliphatic alcohol having 8 or more carbon atoms is lauryl alcohol, stearyl alcohol, or eicosanol.

10. A polyacetal according to claim 7, wherein the p-alkylated phenol having 8 or more carbon atoms in the alkyl group is p-octylphenol or p-nonylphenol.

11. A polyacetal according to claim 8, wherein the long-chain aliphatic carboxylic acid is lauric acid, stearic acid, oleic acid, or ricinolic acid.

12. A polyacetal according to claim 1, wherein the alkylene oxide is ethylene oxide.

13. A polyacetal according to claim 1, wherein the alkylene oxide is propylene oxide.

14. A polyacetal according to claim 1, wherein the number of moles (n) of the alkylene oxide added to 1 mole of the alcohol or carboxylic acid is in the range of 2 to 250.

15. A process for producing a polyacetal, which comprises homopolymerizing formaldehyde or trioxane in the presence of a compound selected from the group of compounds represented by the general formula

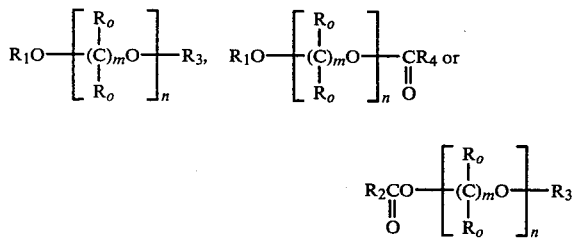

wherein $R_0$ is a hydrogen atom, alkyl group, substituted alkyl group, aryl group, or substituted aryl group, $R_0$'s may be the same or different, $R_1$ is an alkyl group, substituted alkyl group, aryl group, or substituted aryl group, $R_2$ is a hydrogen atom, alkyl group, substituted alkyl group, aryl group, or substituted aryl group, $R_3$ is a hydrogen atom, alkyl group, substituted alkyl group, aryl group, or substituted aryl group, and $R_4$ is a hydrogen atom, alkyl group, substituted alkyl group, aryl group, or substituted aryl group, m is from 2 to 6, and n is from 1 to 1,000.

16. A process for producing a polyacetal, which comprises homopolymerizing trioxane in the presence of a compound represented by the general formula

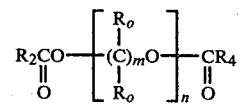

wherein $R_0$, $R_2$, $R_4$, m and n are as defined in claim 15.

17. A process for producing a polyacetal, which comprises copolymerizing a compound selected from the group consisting of formaldehyde, trioxane and polyoxymethylenes with a cyclic ether in the presence of a compound selected from the group of compounds represented by the general formula

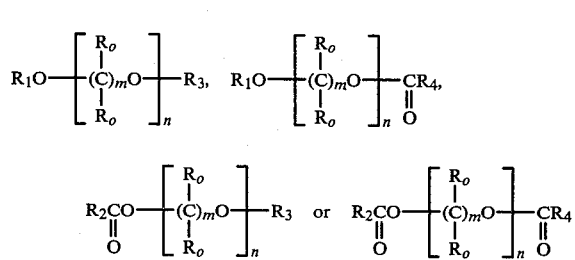

wherein $R_0$ is a hydrogen atom, alkyl group, substituted alkyl group, aryl group, or substituted aryl group, $R_0$'s may be the same or different, $R_1$ is an alkyl group, substituted alkyl group, aryl group, or substituted aryl group, $R_2$ is a hydrogen atom, alkyl group, substituted alkyl group, aryl group, or substituted aryl group, $R_3$ is a hydrogen atom, alkyl group, substituted alkyl group, aryl group, or substituted aryl group, and $R_4$ is a hydrogen atom, alkyl group, substituted alkyl group, aryl group, or substituted aryl group, m is from 2 to 6, and n is from 1 to 1,000.

18. A process according to claim 17, wherein the cyclic ether is ethylene oxide.

19. A process according to claim 17, wherein the cyclic ether is ethylene glycol formal, diethylene glycol formal, or 1,4-butanediol formal.

20. A process according to claim 15, 16 or 17, wherein the homopolymerization or copolymerization is carried out in the absence of a solvent.

21. A process according to claim 15, 16 or 17, wherein the homopolymerization or copolymerization is carried out in an organic solvent medium.

* * * * *